June 4, 1963   J. R. GREEN   3,092,144
CONTROL VALVES
Filed Feb. 10, 1960   4 Sheets-Sheet 1

Inventor
Jack Raymond Green
By
Pennie, Edmonds, Morton, Barrows & Taylor
Attorneys June 4, 1963  J. R. GREEN  3,092,144
CONTROL VALVES
Filed Feb. 10, 1960  4 Sheets-Sheet 2

Inventor
Jack Raymond Green
By
Fennie, Edmonds, Morton, Barrows & Taylor
Attorneys June 4, 1963  J. R. GREEN  3,092,144
CONTROL VALVES Filed Feb. 10, 1960  4 Sheets-Sheet 3

Inventor
Jack Raymond Green
By
Pennie, Edmonds, Morton, Barrows & Taylor
Attorneys United States Patent Office 3,092,144
Patented June 4, 1963

3,092,144
CONTROL VALVES
Jack Raymond Green, London, England, assignor to Vickers Research Limited, London, England, a company of Great Britain
Filed Feb. 10, 1960, Ser. No. 7,849
Claims priority, application Great Britain Feb. 27, 1959
15 Claims. (Cl. 137—625.3)

This invention relates to valves for controlling the flow of fluids.

According to the present invention there is provided a control valve having an inlet formed by a first port and an outlet formed by a second port, a displaceable valve member one side of which cooperates with a valve part having a plurality of first passageways which place one of said ports in communication with said one side of the valve member, said part also having at least one second passageway which places said one side of the valve member in communication with the other port, each first passageway having a first opening adjacent the valve member and each second passageway having a second opening adjacent the valve member, the first and second openings being at least partly interspersed, and there being means for applying a fluid of controlled pressure to the opposite side of said valve member to control the displacement of said member from said part thereby to control flow from the inlet to the outlet via the passageways and beween the valve member and said part.

For a better understanding of the invention and to show how the same may be carried into effect reference will now be made to the accompanying drawings in which.

Figure 3:
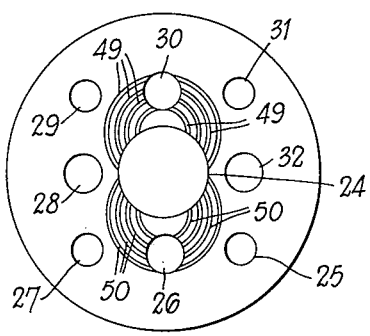
Figure 10:
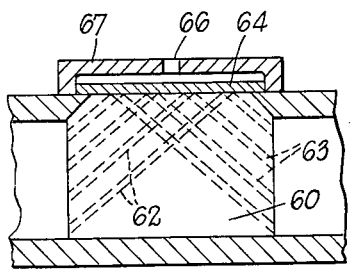
Figure 4:
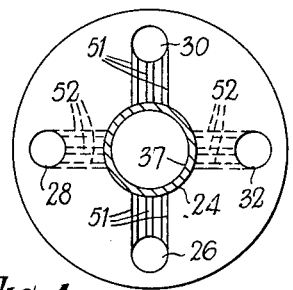
Figure 5:
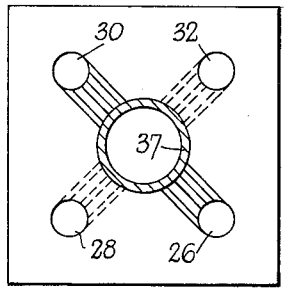
Figure 6:
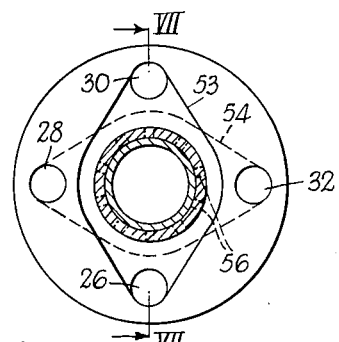
Figure 7:
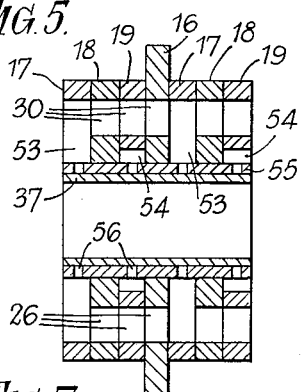
Figure 8:
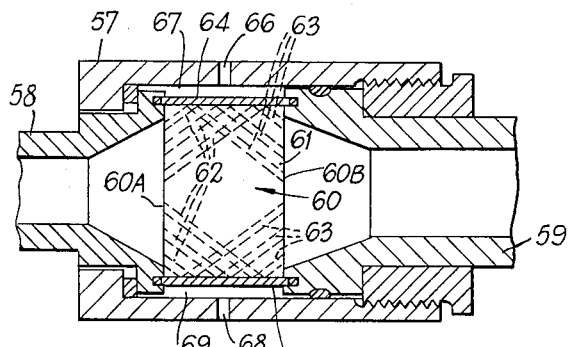
Figure 9:
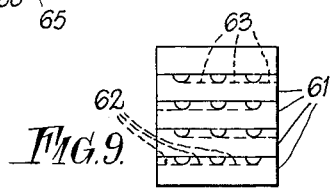

FIGURE 3 is a plan view, to a smaller scale, of a part of the valve of FIGURE 2, FIGURES 4, 5 and 6 are diagrammatic plan views of parts of three further valves, FIGURE 7 is a sectional view on VII—VII of FIGURE 6, FIGURE 8 is a semi-diagrammatic longitudinal sectional view of a further valve, FIGURE 9 is a plan view of a part of the valve of FIGURE 8, FIGURE 10 is a diagrammatic sectional view of another valve, and FIGURES 11 to 19 are diagrammatic plan and sectional views of parts of still further valves.

Figure 1:
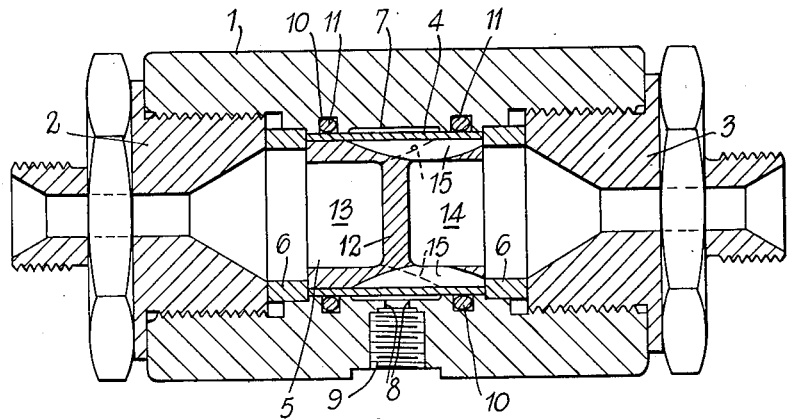
FIGURE 1 is a longitudinal sectional view of a control valve.

The control valve of FIGURE 1 has an elongated hollow body 1 into opposite ends of which are threadedly engaged an inlet union 2 and an outlet union 3. A cylindrical bore in the central portion of the body 1 has a nylon sleeve 4 inserted therein. A hollow cylindrical core 5 is fitted in the sleeve 4. The sleeve 4 and core 5 are located in the bore of the valve body 1 by means of spacers 6 of ring form which are disposed between the ends of the sleeve 4 and core 5 and the adjacent unions 2 and 3. A wide shallow annular groove 7 is formed in the central part of the bore, the groove 7 communicating by way of ports 8 with a threaded hole 9 directed radially into the valve body 1. At each side of the groove 7 there is provided a circular sectioned sealing ring 10 which is disposed in an annular groove 11 in the bore of the body 1.

The interior of the core 5 is divided by a central partition 12 into two chambers 13 and 14. Two series of longitudinally extending radially directed slots 15 are formed in the core 5, the slots in each series being at equiangular intervals around the periphery of the core. There are 36 slots 15 in each of the two series, the slots 15 of one series extending from the right-hand end of the core 5 to just beyond the left-hand side of the partition 12 and the slots 15 of the other series extending from the left-hand end of the core 5 to just beyond the right-hand side of the partition 12. Each slot 15 of said one series lies centrally between two slots 15 of said other series. Thus the slots of one series are interdigitated with those of the other series. The slots 15 are plunge-cut, that is to say, the bottom of each slot is of curved form and the slots 15 are sufficiently deep for the very bottom of each slot to communicate with the adjacent chamber 13 or 14. The slots 15 of said one series communicate with the chamber 14 and the slots 15 of said other series communicate with the chamber 13.

In use of the valve shown in FIGURE 1 the inlet union 2 is connected to a supply of liquid at high pressure, say, 3000 lbs. per square inch. The hole 9 is connected to have fluid at a control pressure supplied thereto and the union 3 is connected to supply liquid to a controlled device. The control fluid fed to the hole 9 passes through the ports 8 and fills the recess 7, urging the nylon sleeve 4 towards the exterior surface of the core 5. The high pressure liquid fed to the union 2 fills the chamber 13 and said other series of slots 15, the liquid in these slots urging the sleeve 4 outwardly. The extent to which the high pressure liquid elastically deforms the sleeve 4 and displaces the latter radially outwardly is determined by the magnitude of the pressure of the control fluid in the groove 7. The liquid escapes from said other series of slots 15 and flows between the interior surface of the sleeve 4 and the exterior surface of the core 5 into the slots 15 of said one series from whence it flows into the chamber 14 and via the union 3 to the controlled device.

The inside surface of the sleeve 4 is subjected to the inlet pressure existing in the chamber 13 over 36 small regions immediately opposite the slots 15 associated with the chamber 13 and to the outlet pressure existing in the chamber 14 over 36 small regions immediately opposite the slots 15 associated with the chamber 14. The parts of the inside surface of the sleeve 4 that are not immediately opposite any of the slots 15 are subjected to pressures intermediate the inlet and outlet pressures. The material of the sleeve 4 is sufficiently rigid to ensure that the sleeve 4 conforms only slightly to the pattern of high and low pressures, the predominant behaviour being that the sleeve 4 moves as a whole, as if acted on by a uniform pressure of some value intermediate between the inlet and outlet pressures.

It will be understood that by decreasing the pressure of the control fluid the radial displacement of the sleeve 4 from the core 5 is increased and the flow to the controlled device is also increased. Similarly, when the pressure of the control fluid is increased the radial displacement of the sleeve 4 from the core 5 is decreased and the flow to the controlled device is decreased.

For a given valve opening the flow through the valve is a function of the difference between the inlet and outlet pressures. An increase in the outlet pressure, with the inlet and control pressures remaining constant, increases the average pressure acting on the inside surface of the sleeve 4 and therefore increases the valve opening. By careful choice of the values of the valve parameters it is possible to arrange that the drop in velocity of liquid flowing through the valve caused by an increase in outlet pressure is just compensated by the increase in valve opening due to the same cause. This compensation can be achieved for various values of the control pressure so that irrespective of the outlet pressure the flow through the valve is determined substantially by the control pressure for a given value of the inlet pressure. This property is advantageous where the valve is used, for example, in controlling the supply of liquid to an hydraulic jack or motor in cases where it is desirable that the load should be moved by the jack or motor at a speed determined by a control lever and irrespective of the magnitude of the load.

In a modification (not shown) of the embodiment of FIGURE 1 the sleeve 4 and core 5 are located against endwise displacement by means of circlips instead of by the spacers 6.

Figure 2:
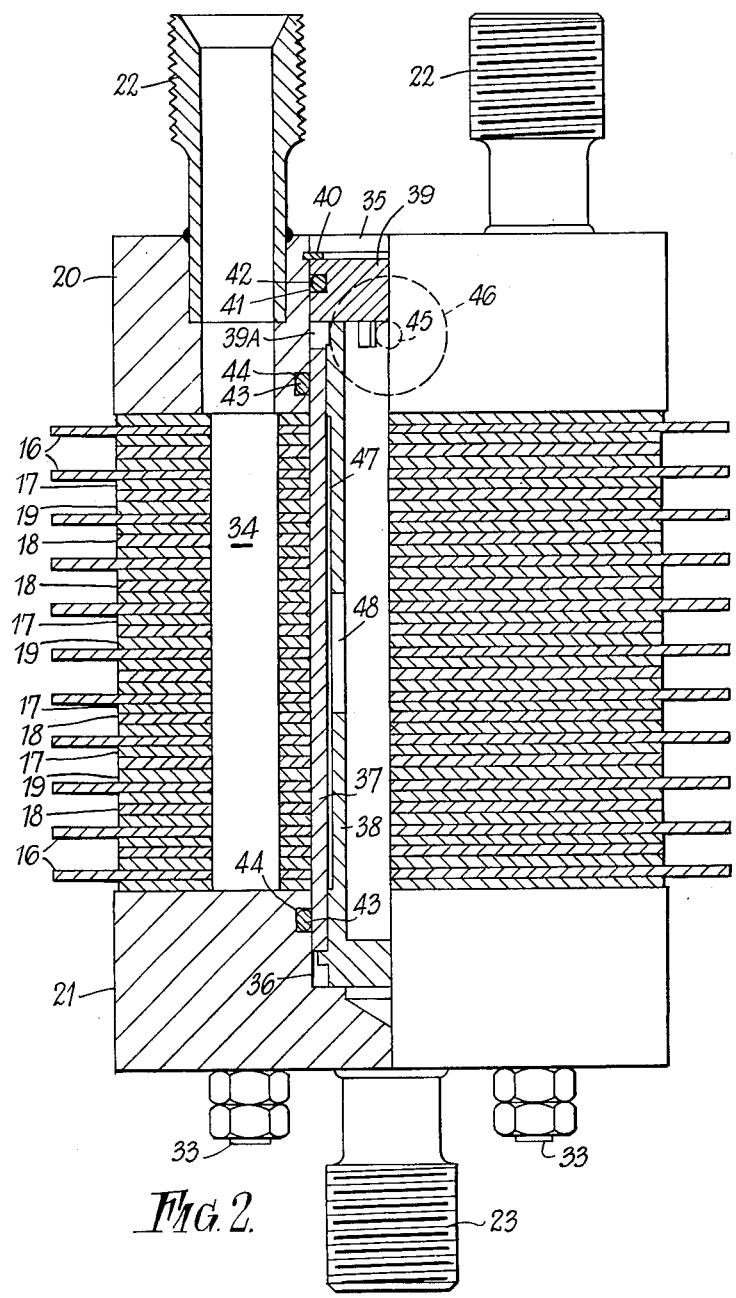
FIGURE 2 is a partly sectioned side elevation of another control valve.

The valve of FIGURE 2 has a stack of circular plates 16 to 19 mounted between end caps 20 and 21. The cap 20 has two inlets 22 and the cap 21 has two outlets 23 which are one behind the other in FIGURE 2 so that only one is visible. Each plate 16 to 19 has a central hole 24 (FIGURE 3) and eight holes 25 to 32 disposed around the hole 24 on the border of a square, the holes 25, 27, 29 and 31 being at the corners of the square and the holes 26, 28, 30 and 32 being half-way along the sides of the square. The holes 24 to 32 of the stack of plates 16 to 19 are aligned with each other and bolts 33 are passed through the four holes 25, 27, 29 and 31 and corresponding holes in the end caps 20 and 21 to hold the caps and plates together. The aligned holes 30 form an inlet passageway 34 which communicates with one of the inlets 22. The aligned holes 26 form another inlet passageway which communicates with the other inlet 22. The aligned holes 28 and the aligned holes 32 form two outlet passageways which communicate one with each of the two outlets 23.

A hole 35 is formed through the end cap 20 in alignment with the aligned holes 24 and a blind hole 36 is formed in the end cap 21 also in alignment with the holes 24. A sleeve 37 of nylon fitted onto the exterior of a tube 38 is inserted in the bore formed by the aligned holes 24. The lower end of the tube 38 and the lower end of the sleeve 37 enter the hole 36. The upper end portions of the sleeve 37 and the tube 38 project into the hole 35, the top of the tube 38 being above the top of the sleeve 37. The upper end of the tube 38 is castellated and is of reduced diameter. The upper end of the sleeve 37 is also preferably castellated. A plug 39 is inserted in the hole 35 and is maintained therein by a circlip 40. An annular passage 39A is formed between the top of the sleeve 37 and the plug 39, the passage being around the reduced diameter portion of the upper end of the tube 38. The plug 39 has an annular groove 41 around its periphery in which is disposed a circular-sectioned sealing ring 42. Sealing rings 43 in grooves 44 are provided for preventing leakage of liquid around the ends of the sleeve 37. A radially directed passageway 45 in the end cap 20 places a union 46 in communication with the passage 39A, and the passageways formed by the castellations at the upper end of the tube 38 effect communication between the passage 39A and the interior of the tube 38. The tube 38 has a shallow wide groove 47 around its outer surface, the width of the groove being equal to the distance between the caps 20 and 21. Longitudinal slots 48 through the central part of the wall of the tube 38 place the interior of the latter in communication with the groove 47.

Each plate 17 has formed in one face thereof a first series of curved grooves 49 (FIGURE 3) which place the hole 30 and thus the passageway 34 in communication with the hole 24. Each plate 17 also has a second series of curved grooves 50 which place the hole 26 in communication with the hole 24. The plates 19 are similar to the plates 17 except that the first series of curved grooves establish communication between the holes 32 and the holes 24 and the second series establish communication between the holes 28 and the hole 24. The plates 16 and 18 have no grooves therein.

The valve of FIGURE 2 is used as follows. The union 46 has fluid at a control pressure fed thereto, this fluid passing through the passageway 45 and the passage 39A into the tube 38, through the slots 48 and filling the groove 47. The inlets 22 are connected to a source of high pressure liquid at a pressure of, say, 3,000 lbs. per square inch and the outlets 23 are connected to supply liquid to a controlled device. The liquid fed to the inlets 22 flows into the passageways formed by the holes 26 and 30 and fills the grooves 49 and 50 tending to displace the nylon sleeve 37 inwardly from the surface of the bore formed by the aligned holes 24. Inward movement of the sleeve 37 is opposed by the fluid in the groove 47. The sleeve 37 operates similarly to the sleeve 4 of FIGURE 1 so that it will be understood that the extent to which the nylon sleeve 37 is displaced from the bore formed by the holes 24 is controlled by the pressure of the control fluid in the groove 47. Liquid flowing from the grooves 49 and 50 in the plates 17 flows over the outside surface of the sleeve 37, through the holes 24 in the adjacent plates 16 and 18 and enters the first and second series of grooves in the plates 19. The liquid flows along these grooves to the holes 32 and 28 and then via the outlets 23 to the controlled device. It will be understood that the flow to the controlled device varies in accordance with the pressure of the control fluid fed to the union 46.

In FIGURE 4 there is shown a plate arrangement for use in a valve like that of FIGURE 2 and in which instead of curved grooves, straight grooves 51 are formed in each plate 17 for placing the holes 26 and 30 in communication with the hole 24 and straight grooves 52 are formed in the plates 19 for placing the holes 28 and 32 in communication with the hole 24. The plate arrangement illustrated in FIGURE 5 is similar to that of FIGURE 4 except that the plates are square instead of circular.

The plate arrangement of FIGURES 6 and 7 is also applied to a valve similar to that of FIGURE 2. Each plate 17 has a diamond-shaped hole 53 therethrough, the opposite ends of the hole 53 being in alignment with the holes 26 and 30 of the other plates. Each plate 19 has a diamond-shaped hole 54 therethrough, this hole being transverse to the holes 53 of the plates 17 and opposite ends of the holes 54 communicating with the aligned holes 28 and 32 of the other plates. A rigid tube 55 is placed over the sleeve 37 and this tube has a circumferential ring of radially directed ports 56 associated with each of the holes 53 and 54.

In use of the valve having the arrangement of FIGURES 6 and 7 the supply liquid flows along the passageways formed by the aligned holes 26 and 30 and fills the holes 53 and the associated ports 56. The sleeve 37 is displaced inwardly by an amount determined by the pressure of the control fluid acting against the inner surface of the sleeve 37. Liquid flows inwardly through the ports 56 associated with the holes 53, between the sleeve 37 and the tube 55 and outwardly through the ports 56 associated with the holes 54. From the holes 54 the liquid flows through the holes 28 and 32 to the controlled device as in the valve of FIGURE 2. The plates 16 and 18 prevent leakage of liquid from the holes 53 to the holes 54 along the exterior of the tube 55.

The valve of FIGURE 8 has a body 57 in opposite ends of which inlet and outlet unions 58 and 59 are secured. The bore of the inlet union 58 leads to one face 60A of a rectangular block 60 which consists of a plurality of rectangular plates 61, the plates being side-by-side and pressed together. Every other plate 61 in the block 60 has a plurality of grooves 62 leading from the face 60A to the upper and lower faces of the block 60. The remaining plates 61 have a plurality of grooves 63 leading from the top and bottom of the block 60 to the face 60B which is on the opposite side of the block 60 to the face 60A. An upper nylon plate 64 having opposite edges mounted in slots in the unions 58 and 59 co-operates with the top of the block 60. Similarly a lower nylon plate 65 carried by the unions 58 and 59 co-operates with the bottom of the block 60. A port 66 through the body 57 communicates with a space 67 above the plate 64 and a port 68 through the body 57 communicates with a space 69 below the plate 65.

In use of the valve of FIGURE 8 the inlet union 58 is connected to a source of high pressure liquid, the union 59 leads to a controlled device and the ports 66 and 68 are connected to receive a fluid the pressure of which is controlled. The high pressure liquid flows along the grooves 62 and displaces the plates 64 and 65 from the block 60 by an amount depending upon the pressure of the control fluid in the spaces 67 and 69. The liquid flows from the grooves 62 between the plate 64 and the top of the block 60 and between the plate 65 and the bottom of the block 60 into the grooves 63 and from thence via the union 59 to the controlled device.

The valve of FIGURE 10 is similar to that of FIGURE 8 except that the lower grooves 62 and 63 and the lower plate 65 and its associated parts are omitted.

Figure 11:
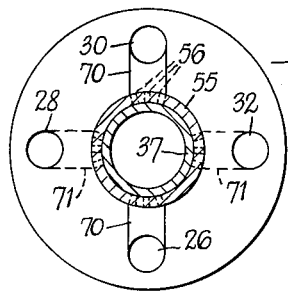
Figure 12:
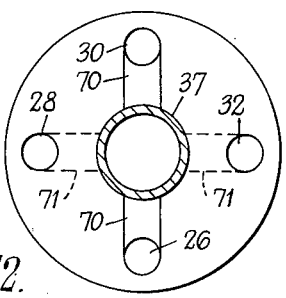
Figure 13:
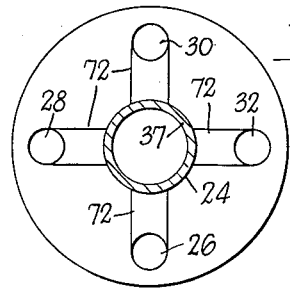

FIGURES 11 to 13 illustrate plate arrangements which are applied to valves similar to that of FIGURE 2.

The arrangement of FIGURE 11 is somewhat similar to that of FIGURE 6, although no spacer plates 16 and 18 are employed. The plates 17 have radially directs slots 70 the outer ends of which are aligned with the holes 26 and 30 in the plates 19 and the inner ends of which communicate with associated ports 56 through the tube 55. The plates 19 have radially directed slots 71 the outer ends of which are aligned with the holes 28 and 32 in the plates 17 and the inner ends of which cooperate with associated ports 56 through the tube 55.

The arrangement of FIGURE 12 is the same as that of FIGURE 11 except that the tube 55 is omitted, the inner ends of the slots 70 and 71 co-operating directly with the exterior surface of the nylon sleeve 37.

In the plate arrangement of FIGURE 13 no spacer plates are employed and all the plates are identical. Each plate has the four holes 26, 28, 30 and 32 and a radially directed shallow groove 72 in one face of the plate extends from each of these four holes to the central hole 24 in which the sleeve 37 is fitted without the interposition of any tube similar to the tube 55.

Figure 14:
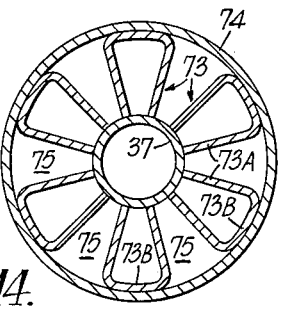

The valve diagrammatically illustrated in FIGURE 14 has six channels 73 disposed angularly around the nylon sleeve 37, the flanges 73A of the channels 73 being radially directed and the bases 73B of the channels being brazed to the interior wall of a cylinder 74. Caps (not shown) closing the ends of the cylinder 74 are provided one with passageways for conveying liquid under pressure to the channels 73 and the other for conveying liquid from the spaces 75 between adjacent channels 73 to a controlled device. Liquid at a controlled pressure is applied to the interior of the sleeve 37 to control the flow of liquid between the edges of the flanges 73A and the exterior of the sleeve 37.

Figure 15:
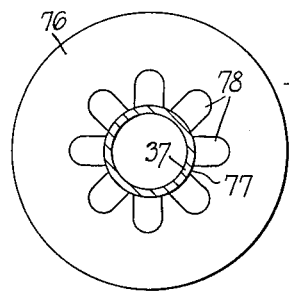

The valve of FIGURE 15 has a cylindrical block 76 in which is formed an axial bore 77. The nylon sleeve 37 is fitted in the bore 77. A plurality of longitudinally extending U-sectioned grooves 78 is formed in the surface of the bore 77. Alternate grooves 78 are supplied with high pressure liquid and the remaining grooves 78 lead to a controlled device. Fluid the pressure of which is controlled is fed to the interior of the sleeve 37 to control the flow of liquid from the supply grooves 78 to the controlled device.

Figure 16:
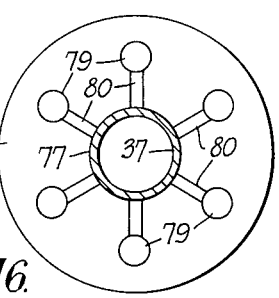

The valve of FIGURE 16 is somewhat similar to that of FIGURE 15 except that the grooves 78 are replaced by longitudinal holes 79 which communicate with the bore 77 by way of radially directed slots 80.

Figure 17:
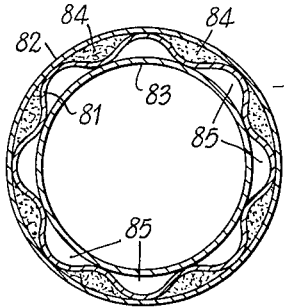

The valve of FIGURE 17 has a tube 81, which is formed with longitudinal corrugations, disposed between an outer cylindrical shell 82 and an inner nylon sleeve 83. The spaces 84 between the shell 82 and the tube 81 are filled with any suitable solid material. Alternate spaces 85 between the tube 81 and the sleeve 83 are connected to be supplied with high pressure liquid while the remaining spaces 85 lead to a device to be controlled.

Fluid the pressure of which is controlled is fed to the interior of the sleeve 83. It will be understood that the extent to which the sleeve 83 is displaced from the inner crests of the corrugations of the tube 81 by the high pressure liquid is dependent upon the pressure of the control fluid. Thus the flow of the liquid through the valve is dependent upon the pressure of the control fluid.

Figure 18:
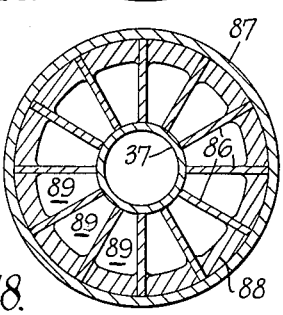

The valve of FIGURE 18 has a plurality of radially directed webs 86 contained in a cylindrical shell 87. Metal 88 is centrifugally cast into the spaces between adjacent webs 86 to secure the webs 86 to the shell 87. The inner edges of the webs 86 co-operate with the exterior of the sleeve 37. Alternate spaces 89 between adjacent webs 86 are supplied with high pressure liquid and the remaining spaces lead to a controlled device. Fluid at a controlled pressure is fed to the interior of the sleeve 37 to control the flow of liquid through the valve.

Figure 19:
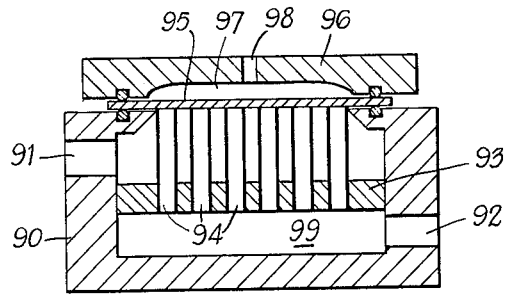

FIGURE 19 shows a valve which is a variant of that of FIGURE 10. A body 90 has an inlet 91 and an outlet 92. A horizontal plate 93 is secured in the body 90 at a location above the outlet 92 and below the inlet 91. The lower ends of a plurality of vertical tubes 94 are fixed in holes through the plate 93. The upper ends of the tubes 94 are at the same level and co-operate with a nylon plate 95, the border of which is secured between the top of the body 90 and a closure member 96. On its underside the closure member has a recess 97 to which a passageway 98 leads. Fluid at a controlled pressure is fed to the passageway 98. High pressure liquid is supplied to the inlet 91 causing the plate 95 to be deflected upwardly against the force exerted thereon by the control fluid and liquid flows over the rims at the upper ends of the tubes 94, down the latter to the chamber 99 below the plate 93 and thence to the outlet 92.

It will be understood that FIGURES 4 to 7 and 11 to 18 are diagrammatic and some parts are omitted. In particular it is to be understood that the sleeves 37 and 83 are in the valve arrangements of these figures provided with an interior tube similar to the tube 38 of FIGURE 2.

In the above description it has been mentioned that the sleeves 4, 37 and 83 and the plates 64, 65 and 95 are of nylon. Whilst nylon is the preferred material for many applications, other material, for example, metal, may be more suitable for other applications. All the sleeves operate as described in connection with the sleeve 4 of FIGURE 1.

Each of the valves described above can be advantageously used as the second stage of a two-stage electro-hydraulic servo unit. The first stage of the unit consists of an electromagnetically operated hydraulic valve which controls the pressure of the control fluid that is fed to the second stage valve.

I claim:

1. A control valve comprising a housing having an inlet formed by a first port and an outlet formed by a second port, a displaceable valve member having one side which constitutes a valve control surface, said displaceable valve member being designed sufficiently rigid to ensure that, in operation of the valve for a given range of pressures, said valve member deforms an amount proportional to the pressure differential across the valve member, the ends of said valve member being sealed relative to said housing and moveable relative to said housing, said valve member being moveable as a whole, a valve part having a plurality of first passageways which place one of said ports in communication with said one side of the valve member, said valve part also having a plurality of second passageways which place said one side of the valve member in communication with the other port, each first passageway including a first opening adjacent one side of the valve member and each second passageway including a second opening adjacent said one side of the valve member, the first openings being at least partly interspersed between the second openings, means to preclude flow from the inlet to the outlet except through said passageways, and means for applying a fluid of controlled pressure to the opposite side of said valve member to control the extent of displacement of said member from said part, thereby to control flow from the inlet to the outlet via the passageways and between the valve member and said part.

2. A control valve as set forth in claim 1 in which the size of said first openings may be varied relative to the size of said second openings.

3. A valve as claimed in claim 1, wherein said valve part consists of a plurality of tubes, one end of each tube co-operating with said one side of the displaceable valve member, the bores of the tubes constituting said first passageways and the space around the tubes constituting said second passageways which places said one side of the valve member in communication with said other port.

4. A valve as claimed in claim 1, wherein said passageway openings are of elongated form and are interdigitated.

5. A valve as claimed in claim 1, wherein the valve member is in the form of a flat plate, said valve part being in the form of a block having a flat surface adjacent the plate, the passageway openings being formed in the flat surface of the block.

6. A valve as claimed in claim 1, wherein the valve member is tubular, said valve part being cylindrical and having a cylindrical surface cooperating with one of the cylindrical surfaces of the tubular valve member, the cylindrical surface of said valve part having said openings.

7. A valve as claimed in claim 1, wherein said valve part is of cylindrical form, the valve member being a sleeve fitted over the valve part, and said passageway openings being in the external cylindrical wall of the valve part.

8. A valve as claimed in claim 7, wherein said valve part is a hollow cylinder having opposite ends of the bore separated by a central partition, said passageways consisting of a plurality of interdigitated axially directed slots, each slot being a plunge-cut slot formed in the outer surface of the valve part, the bottom of the slot communicating with the bore of the valve part on one side only of the partition, said partition being said means to preclude flow from the inlet to the outlet except through said passageway.

9. A valve as claimed in claim 1, wherein the valve member is in the form of a sleeve, said valve part being of cylindrical form and having a bore the surface of which co-operates with the exterior surface of said sleeve, said openings being in the surface of the bore.

10. A valve as claimed in claim 1, wherein the valve member is formed as a sleeve, said valve part comprising a plurality of superimposed plates each plate having first, second and third holes therethrough, the first holes being aligned to form a bore the surface of which co-operates with the external surface of said sleeve, the second holes being aligned to form a passage that communicates with said inlet and the third holes being aligned to form a passage that communicates with said outlet, the inlet passageways being formed by grooves in the plates and extending from the first to the second holes and the outlet passageways being formed by grooves in the plates and extending from the first to the third holes.

11. A valve as claimed in claim 10, wherein the grooves forming the inlet passageways are not formed in the same plates as the grooves forming the outlet passageways.

12. A valve as claimed in claim 10, wherein each plate that has an inlet passageway has a plurality of grooves joining the first and second holes, and each plate having an outlet passageway has a plurality of grooves joining the first and third holes.

13. A valve as claimed in claim 10, wherein plates without the grooves but having the first, second and third holes are disposed between adjacent grooved plates.

14. A valve as claimed in claim 10, including the modification that the grooves are formed as slots through the plates.

15. A valve as claimed in claim 1, wherein the valve member is in the form of a sleeve, said valve part being formed by a stack of plates each having a central hole through which the sleeve is passed, the stack having therein first and second passages formed by aligned holes in the plates, the first passage communicating with said inlet and the second passage communicating with said outlet, and there being a tube around said sleeve the interior surface of the tube co-operating with the exterior surface of the sleeve, every fourth plate in the stack being apertured to place said first passage in communication with the exterior of said sleeve via ports through the tube, which ports constitute said inlet passageways, each plate that is mid-way between two such apertured plates being apertured to place said second passage in communication with the exterior of said sleeve via further ports through said tube which further ports constitute said outlet passageways, the tube being passed through said central holes of the remaining plates in a fluid-tight manner.

References Cited in the file of this patent

UNITED STATES PATENTS

| | | |
|---|---|---|
| 2,747,608 | Grove | May 29, 1956 |
| 2,931,386 | Boehler | Apr. 5, 1960 |
| 3,011,758 | McFarland | Dec. 5, 1961 |

FOREIGN PATENTS

| | | |
|---|---|---|
| 447,707 | Canada | Apr. 6, 1948 |